US005638745A

United States Patent [19]
Lokhandwala et al.

[11] Patent Number: 5,638,745
[45] Date of Patent: Jun. 17, 1997

[54] JUICE FINISHER

[75] Inventors: Juzar A. Lokhandwala, Temple Terrace; Carl R. Christian, Bade City, both of Fla.

[73] Assignee: FMC Corporation, Chicago, Ill.

[21] Appl. No.: 415,809

[22] Filed: Apr. 3, 1995

[51] Int. Cl.$^6$ .............. A23N 1/00; B30B 9/14; B08B 3/02; B08B 9/00
[52] U.S. Cl. .............. 99/510; 99/495; 100/117; 100/145; 366/90; 366/322
[58] Field of Search ............ 99/486, 487, 495, 99/509–513; 100/112, 126, 127, 117, 145; 134/172; 210/143, 411, 412, 108, 393; 241/74; 366/90, 322

[56] References Cited

U.S. PATENT DOCUMENTS

| | | |
|---|---|---|
| 4,154,536 | 5/1979 | Sokolow ..................... 366/90 |
| 4,408,725 | 10/1983 | Wenger et al. ............... 366/79 |
| 4,416,544 | 11/1983 | Blach ........................... 366/90 |
| 4,587,896 | 5/1986 | Steinke ........................ 100/117 |
| 4,600,311 | 7/1986 | Mourrier et al. ............ 366/322 |
| 4,646,631 | 3/1987 | Ward ............................ 100/145 |
| 4,651,637 | 3/1987 | Steinke ........................ 100/117 |
| 4,846,054 | 7/1989 | Mange et al. ................ 99/495 |
| 5,193,446 | 3/1993 | Olusczak et al. ............ 134/172 |
| 5,318,358 | 6/1994 | Wobbe et al. ............... 366/322 |
| 5,381,730 | 1/1995 | Kim .............................. 99/510 |
| 5,386,765 | 2/1995 | Olusczak et al. ............ 210/143 |

*Primary Examiner*—Timothy F. Simone

[57] ABSTRACT

An improved juice finisher having a housing including a screen defining a central cavity with a rotating finisher worm disposed within the cavity and having a first section with a plurality of first flights, an intermediate section with a plurality of paddles, and a final section with a plurality of final flights; with the intermediate section beginning at the point the first flights terminate so juice may be more efficiently extracted from juice-carrying pulp.

16 Claims, 7 Drawing Sheets

FIG_7

FIG_8

FIG_9

FIG_10

FIG_11

FIG_12

FIG_13

FIG_14

FIG_15

FIG_16

FIG_17

FIG_18

FIG_19

FIG_20

JUICE FINISHER

This invention has to do with juice finishers of the type used to separate juice from pulp in a stream of juice fed into the finisher after the juice has been extracted from a fruit. More specifically, this invention pertains to the design of the worm or impeller element of a juice finisher. The surface of the worm which will contact the juice stream is provided with an arrangement of flights and proturbances designed to move the pulpy juice through the finisher in a manner least likely to adversely affect the quality of the juice.

SUMMARY OF THE INVENTION

In the juice production segment of the food industry it is common practice to process fresh squeezed juice to remove pulp, frit and other juice stream components that are entrained in the juice stream as the juice exits the juice extractors. This invention pertains to higher volume juice rooms rather than to juice extraction done on a local level such as in a supermarket, hotel or other point of consumption-type situation. In large production juice plants the fruit is fed to an extractor where it is squeezed and piped to the finishers which are the subject of this invention.

The finishers will be used to separate the raw juice into the juice product and the undesirable pulp component of the primary juice stream. The juice will be pumped into the finisher wherein it will flow from an upstream side of a screen member through the screen into an outlet port for the now partially refined juice. Pulp is too course to pass through the screen and will therefore remain in the chamber defined by the upstream surface of the finisher screen.

A finisher worm will reside inside the screen portion of the finisher. The worm will be mounted for rotation around the major axis of the finisher and will rotate to assist the movement of the pulp through the finisher.

Current finisher worms will separate juice from the pulp stream by one or both of two methods. Centrifugal force, where the pulpy juice is forced against an outer screen and the juice escapes through the screen, is the first method. The second method uses compression of the pulp against the screen to separate the juice from the pulp stream. Compression will occur at the discharge end of the worm and will cause free liquid to be separated from the pulp and escape through the screens of the finisher. This technique and juice finishers are well known to persons in the juice processing art and what has heretofore been described is simply the rudimentary background of this invention.

One problem of the state of the art finishers is juice degradation caused by the finisher. In the operation of a normal finisher, the pulpy juice is transferred or driven the length of the worm by the force of the incoming juice. Because the juice entering the finisher does not always fill the volume of space between the worm and the finisher screen, it is believed that there is a small amount of air forced into the juice at the finisher intake. This is thought to be due to the pumping action of the worm. The inclusion of air and the contact of the juice with air is regarded as detrimental to the quality of the juice. Therefore, it is an object of this invention to reduce the amount of air pumped into the juice at the finisher.

Another problem with contemporary finishers is that the pulp in the area of the finisher intake forms layers of different juice content. This juice content in the pulp ranges from dry at the surface of the finisher screens to less dry as measurements are taken closer to the worm. In this scenario, as the pulp is compressed at the discharge end of the finisher, the juice from the pulp near the worm, the wetter pulp, must work itself through the layers of drier pulp to escape through the finisher screen. To cause this migration, high pressure is needed in the finisher in order to remove the liquid and as more pressure is applied to the outer layer or zone of pulp—which is usually drier—the pulp becomes damaged from friction with the finisher screen. This damage may be the principle cause of pulp and pectin extrusion into the finished juice.

In order to address and alleviate the above problems, the invention herein presents new embodiments for finisher worms. Several embodiments are shown, but all are related in that they attempt to regulate or affect the speed that product moves through the finisher. The new designs minimize the pumping of air into the juice by the finisher and seek to minimize the non-uniformity of the pulp dryness by handling the pulp in such a way that layers of pulp of different degrees of dryness are not formed.

One method of improving the quality of a juice product coming out of the finisher is to match the speed of the finisher to the feed rate of the juice stream or juice quantity being fed to the finisher. By matching the speed of the finisher to the feed rate such that there is a balance between the volume of incoming juice and the volume of pulp and refined juice exiting the finisher, the cavity between the screen and the worm will be kept full. With the cavity full there would be no room for air and thus the finisher would not be prone to pump air into the juice.

Another method of improving juice quality can be realized by judicious design of the finisher worm. We have found that breaking up the continuity of the flights on the central structure of the finisher worm provides the improvement desired. Providing an open area in the intermediate section of the worm—normally in the lateral central area—of the worm gives good results. This will slow down the pulp transfer from the intake zone of the finisher to the discharge end of the finisher.

One other method of improving juice quality has been realized by including "breakup baffles" in the intermediate section of the worm. These baffles, which can be of several different shapes, tend to break up the juicy pulp cake and cause it to tumble and be rearranged, thus helping to disturb the layers of pulp of different moisture content.

It is also an object of this invention to provide a finisher that allows incoming juice to flow out of the finisher easily without traveling too far on the worm. That is, the first section of the worm is provided with flights that don't trap the juice between the worm and flights but instead gives open access to the finisher screen in the first section of the worm/screen interface. Not only does this help the quality of the juice but it also can lead to increased juice capacity for the finisher.

BRIEF DESCRIPTION OF THE DRAWING FIGURES

The invention presented herein will be readily understood by a careful reading of this specification in conjunction with a perusal of the drawing figures wherein.

DETAILED DESCRIPTION OF THE INVENTION

Figure 1:
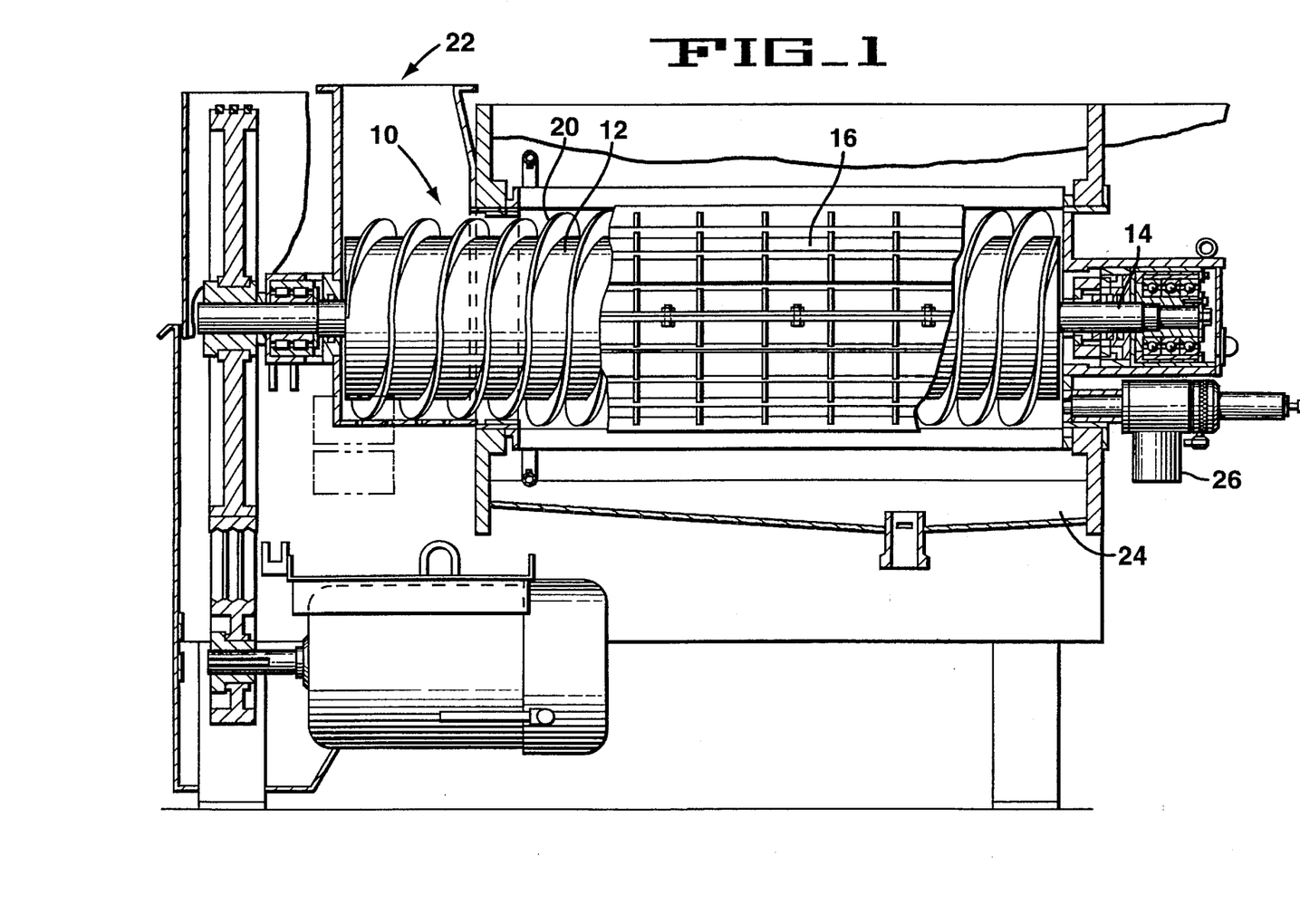
FIG. 1 is a generic juice finisher of the type relating to this invention.

FIG. 1 shows a conventional state of the art juice finisher with some parts broken away to reveal the interior components of the finisher. Of primary importance to this disclosure is the finisher worm, generally 10 which includes a body portion 12 supported on axles 14 at each end thereof. The finisher worm 10 is rotatable carried inside a barrel which is defined by a screen 16. The screen is located so as to be very close to the outer edges of the screw flights 20 carried on the body of the finisher worm.

The infeed section, generally 22, is where juice to be processed will enter the finisher. This juice may be a thin slurry containing pulp and small non-juice components sometimes called "frit." It is the function of the finisher to remove the pulp from the juice. This is done by urging the juice-containing stream through the finisher so that the juice and pulp can be separated by the screen 16. Low pulp-containing juice will flow through the screen to the juice pan 24 and downstream to further processing.

The pulp remaining in the lands between the flights of the finisher worm will be driven by the flights of the rotating worm—the worm rotates in a range between 200 RPM and 500 RPM in the invention herein—until the pulp exits the discharge gate 26 of the finisher. The above represents a conventional structure for a finisher—except for the movable speed aspect which is part of the invention disclosed herein.

Figures 2, 4, 5:
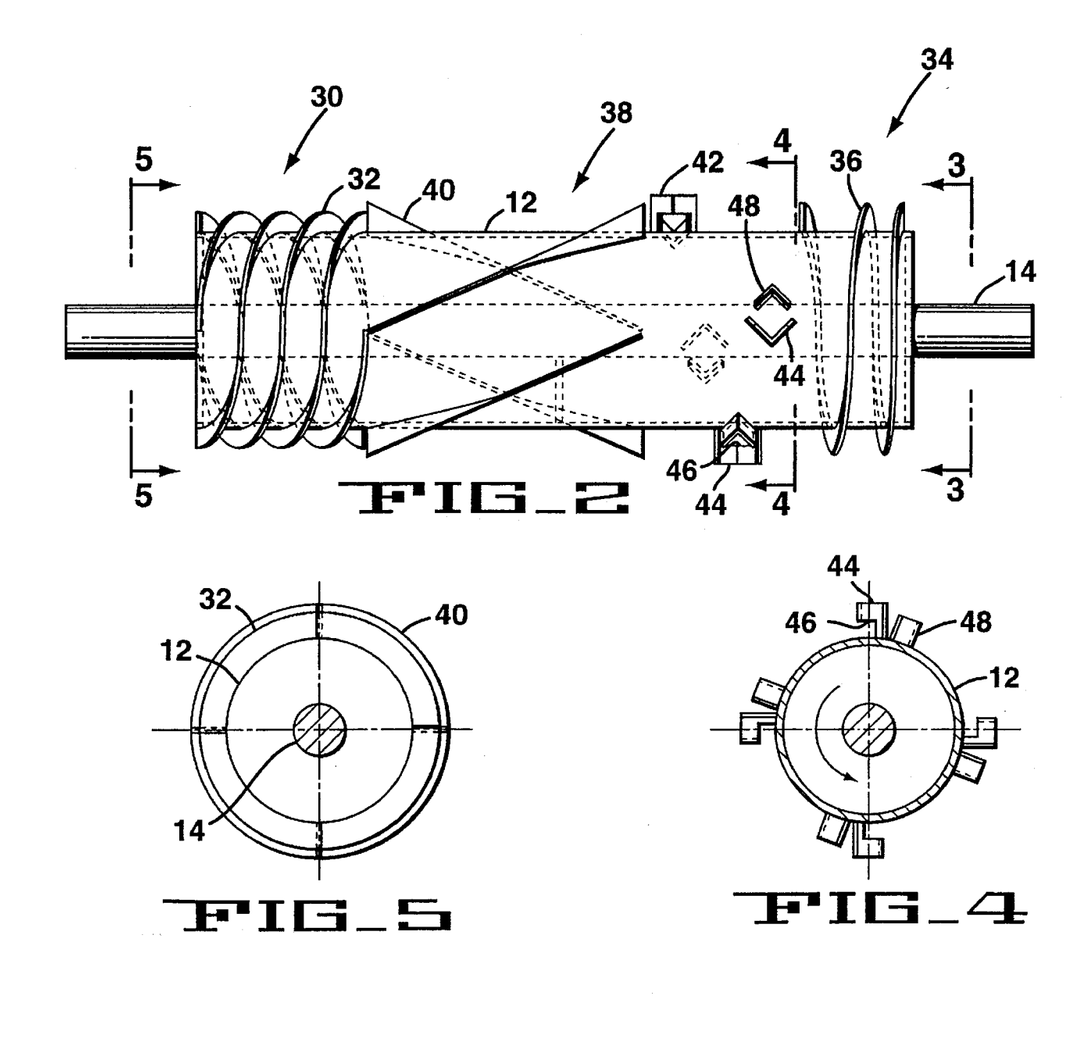
FIG. 2 is a finisher worm having a specific arrangement of flights and baffles.
FIG. 4 is a view of the finisher worm of FIG. 2 taken through plane 4—4.
FIG. 5 is a view of the finisher worm taken through plane 5—5 of FIG. 2.
Figure 3:
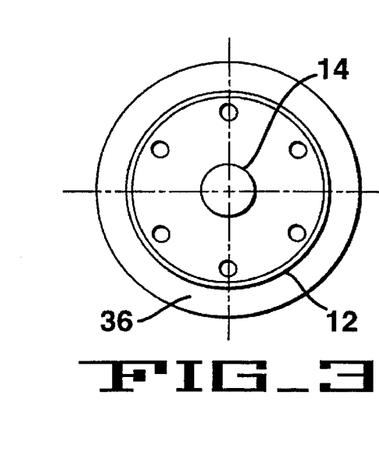
FIG. 3 is an end view of the finisher worm of FIG. 2.

FIG. 2 shows a preferred embodiment of the invention. In this figure, as in FIG. 1 the body 12 of the worm is shown supported on an axle 14. The worm will be rotated clockwise when observed from the inlet zone which is at the left end of FIG. 2.

This embodiment includes several zones of flights and protrusions. In the inlet zone area, generally 30, a spiral flight 32 is used to move material laterally into the area of the barrel of the finisher defined by the screen. This flight in this location is normal.

At the far right end of the finisher worm, namely the discharge zone, generally 34, a spiral flight 36, in this case having a non-uniform lead between flights, will urge the pulp out of the finisher.

In the intermediate zone, generally 38, a unique arrangement of flights and protrusions are shown. Flights 40 are wipers extending from the end of the infeed flights 32 to a point downstream on the body of the finisher body. These wipers 40 will have a height bringing them close to the screen surface and a shallow angle across the major axis of the finisher body 12. This angle could be on the order of 30°. After termination downstream of these wipers 40, a set of proturbances, in this case "cake turners" such as 42, are presented. These elements are two part structures each composed of upstanding sections of angle iron. A first cake turner, two shown as 44, has an opening 46 cut in the bow of the angle iron element so that pulp riding on the body of the finisher worm can pass through the opening 46. This pulp will then encounter a second cake turner element 48 which will direct the pulpy cake upwardly. These sets of cake turners are used to break up the cake and move it around so that it becomes more uniform in moisture content. A series of four cake turner sets 42 are shown in this embodiment, however, more or fewer are also possible.

FIG. 4 shows the cake turners in profile. The opening 46 in the first cake turner 44 is clearly shown. Also the second cake turner element 48 is shown relative to the first cake turner element 44.

FIG. 5, a view through 5—5 of FIG. 2 shows how the wiper style flights such as 40 spiral at a low angle through roughly one quadrant each on the worm body. These wipers 40 are higher in elevation than the flights 32 and the wipers will be very close to the screen surface when the finisher is in operation.

Figure 6:
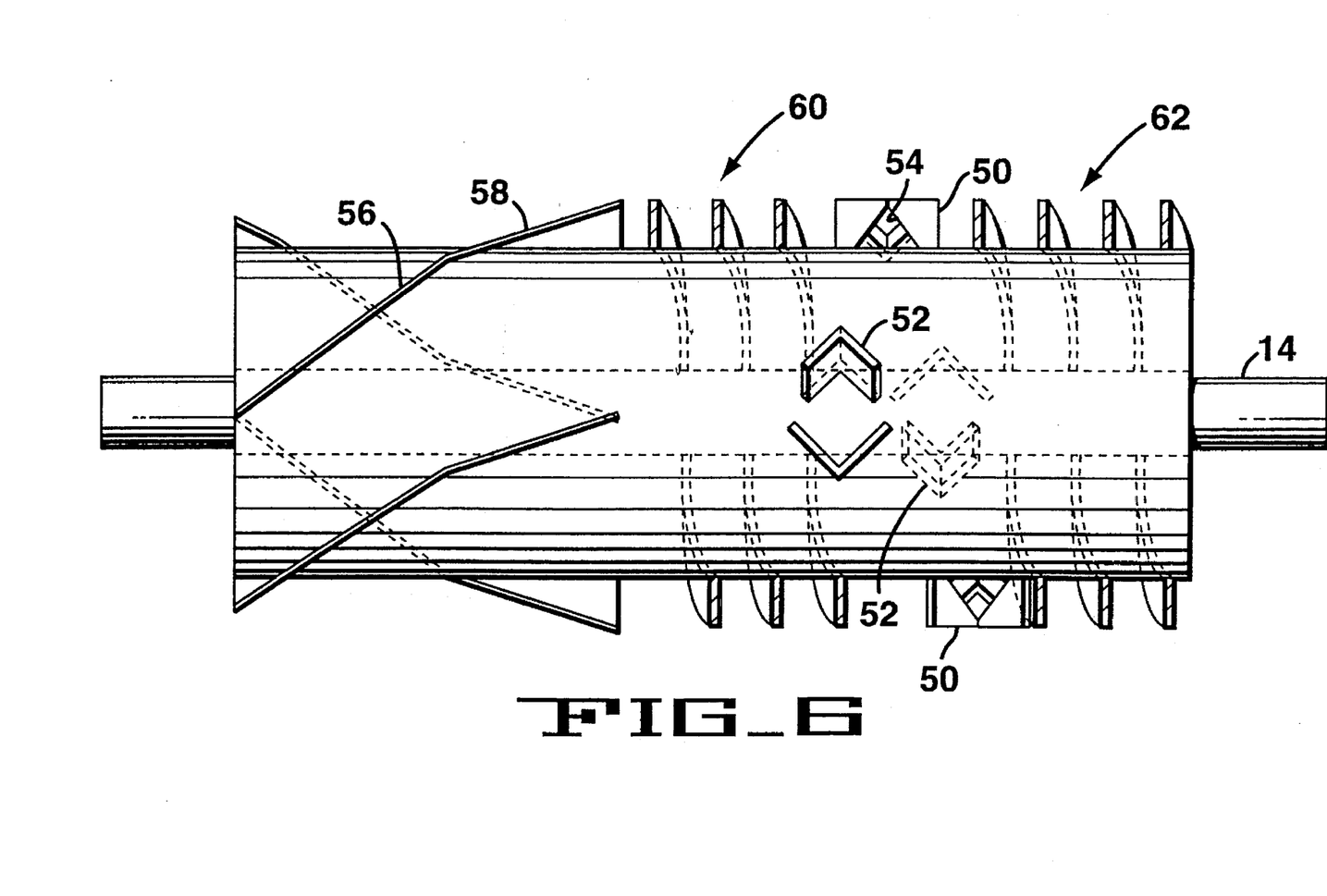
FIG. 6 is an alternative finisher worm having flights and baffles integral therewith.

FIG. 6 is a variation of the finisher worm shown in FIG. 2. The common element in this embodiment, aside from the axle 14 and the body or drum 12, are the cake turners comprised of parts 50 and 52. The opening 54 is somewhat different in shape as shown but in principle these cake turners operate like items 42 in FIG. 2.

At the inlet zone of this FIG. 6 embodiment, a shallow angle flight 56 is used to start the juice into the finisher. The flights have a first overall diameter that is smaller than the cavity in the screen portion of the finisher. Therefore a second, wider portion 58, is formed on each of these flights 56. This helps feed the flowable juice through the finisher before the juice travels any significant length of the finisher. This flowable juice need not be forced against the screen by the pressure of the pulp in the deeper interior of the finisher.

Inboard of the low slope flights 56 and 58 a zone of spiral flights, generally 60 proceed the zone on the body supporting the cake turners 50 and 52. After this cake turner intermediate zone, progressing to the right in this figure, is a zone of exit area flights, generally 62.

Figure 7:
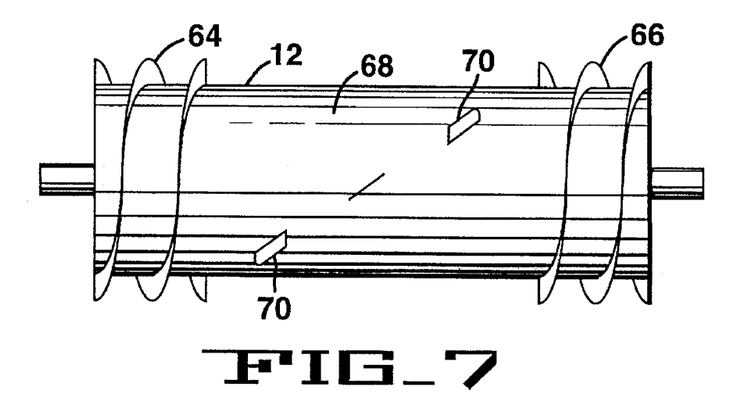
FIG. 7 is a finisher worm having a specific arrangement of flights and baffles.
Figure 8:
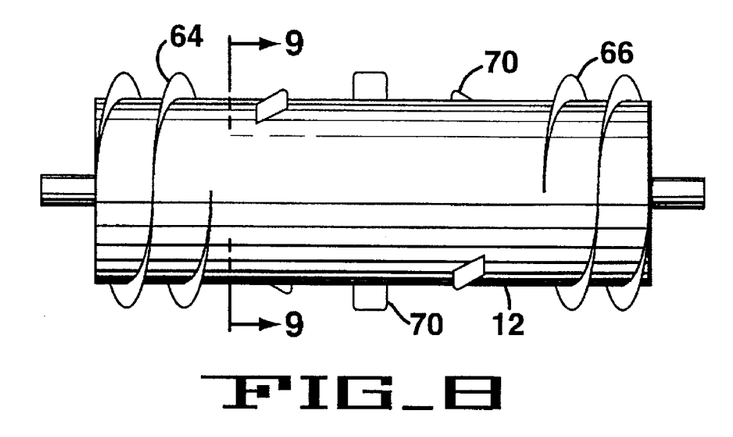
FIG. 8 is the finisher worm shown in FIG. 7 rotated along its major axis by ninety degrees.
Figure 9:
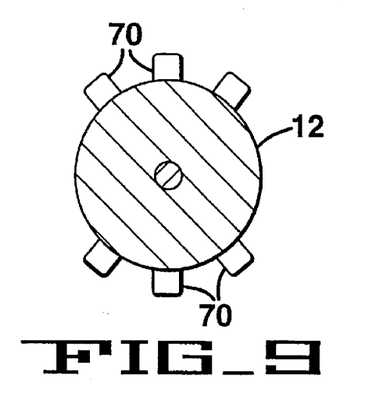
FIG. 9 is a view of intermediate section finisher worm of FIG. 8 taken through plane 9—9 of FIG. 8.

FIGS. 7, 8 and 9 show another embodiment of the invention. In this embodiment the infeed flights 64 and the exit zone flights 66 are standard constant lead flights that start the pulpy juice into the finisher and drive the pulp out of the finisher respectively. In the intermediate zone or section 68 a plurality of paddles 70 are affixed to the body of the finisher worm. These paddles, one shown as 70, will serve to turn and separate the cake built up between the body or drum 12 and the screen of the finisher. Six paddles are shown in these figures. However, a greater or lesser number of paddles could be used with equal facility.

FIG. 9 is a view as taken through plane 9—9 of FIG. 8 except that the exit zone flights 66 are left out of this end view for purposes of clarification.

Figure 10:
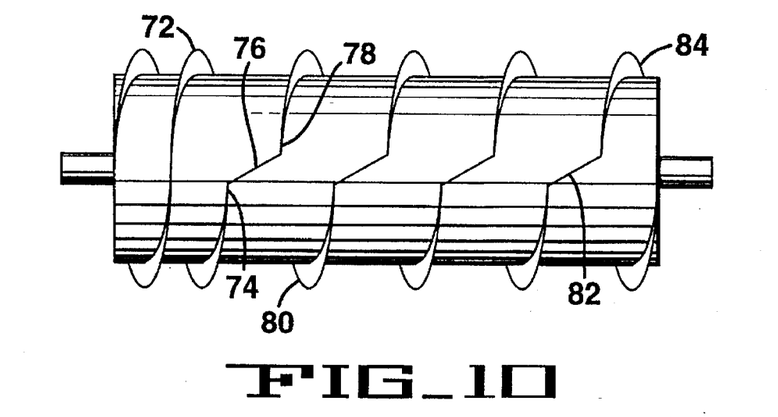
FIG. 10 is another embodiment of a finisher worm.

FIG. 10 is another embodiment of the invention. Here a leadin flight 72 terminates at its inboard end 74 and at that point connects to an upstanding panel 76. The upstanding panel 76 extends to the beginning point 78 of an intermediate flight 80. This pattern continues to the final upstanding panel 82 and the final flight 84. The height of the upstanding panels 76 could be as high as the height of the flight 72 and 84.

Figure 11:
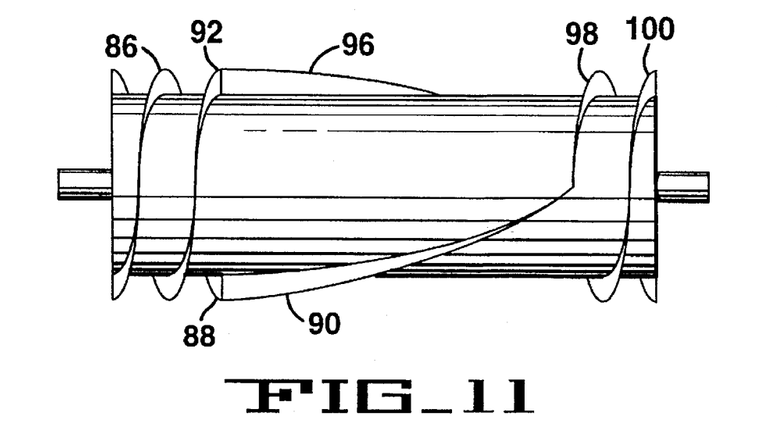
FIG. 11 is a further embodiment of a finisher worm.

FIG. 11 is another embodiment of the invention. In this embodiment, the leadin spiral flight 86 terminates at 88 at a junction with an elongated wiper 90. A second elongated wiper, which is optional, may connect at point 92 with flight 94. This second elongated wiper 96 is similar to the elongated wiper 90. These elongated wipers 90 and 96 will connect to exit zone flights 98 and 100 respectively at the beginning of flights 98 and 100.

Figure 12:
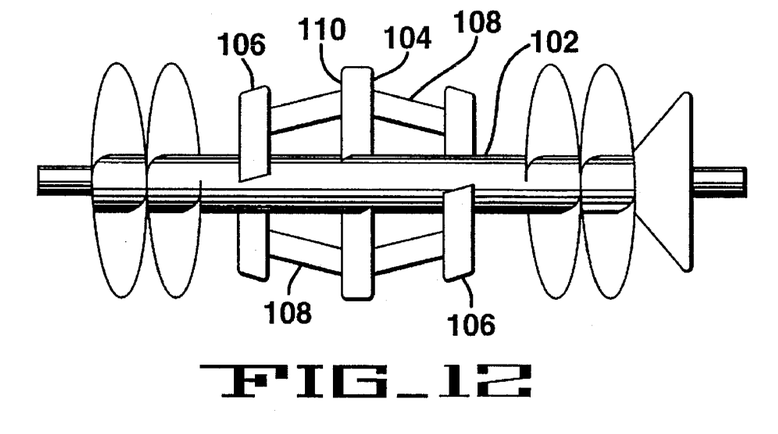
FIG. 12 is a finisher worm with a reduced diameter longitudinal body member.

FIG. 12 is a further embodiment of the invention. The uniqueness of this embodiment is that the body 102 of the worm is much less in diameter than the body portions of the previously described embodiments. Also a juice slinger element 104, two assemblies shown, is carried in the intermediate area of the finisher worm. The juice slinger element 104 includes upstanding paddles such as 106, two of which are connected by bridge plates, such as 108, to a center paddle 110. The paddles 106 and 110 act as cake turners in turning the pulp cake in the area adjacent to the screen so that the cake becomes uniform in juice and moisture content. Since the finisher worm is rotating at speeds up to about 500 RPM the juice contained in the cake is slung against the screen in this design or embodiment.

Figure 13:
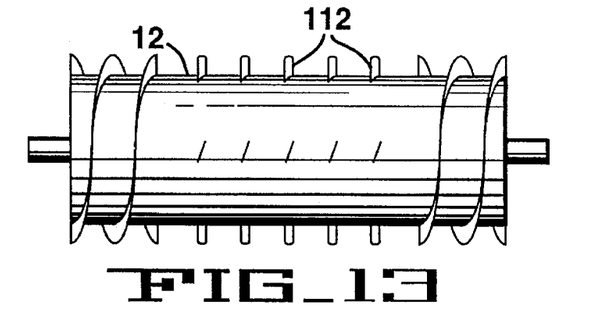
FIG. 13 is a finisher worm with a special form of baffle in the intermediate section thereof.
Figure 14:
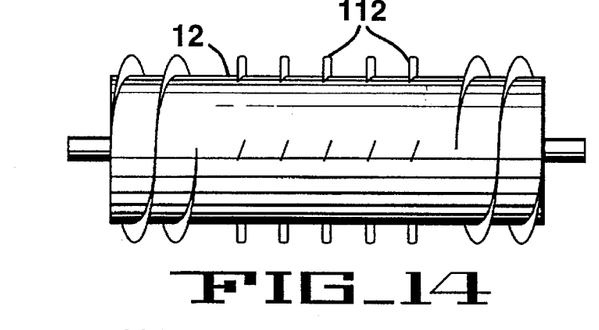
FIG. 14 is the finisher worm of FIG. 13 rotated ninety degrees around its major axis.

FIGS. 13 and 14 are another embodiment of the invention. In this embodiment small paddles 112 are attached to the worm body 12 in the intermediate zone between the infeed and the discharge zone flights. These paddles such as 112 serve to "stir up" and turn the cake and thus make the cake more fluid homogenous. The intermediate zone doesn't have any tight flights to move the pulp through this zone, thus in this embodiment, and in most of the others shown in the figures, this intermediate zone allows a slower, more gentle handling of the pulp. This allows more juice to get separated from the pulp while at the same time prevents degradation of juice quality through the mastication of pulp which could be forced through the openings in the finisher screen.

Figure 15:
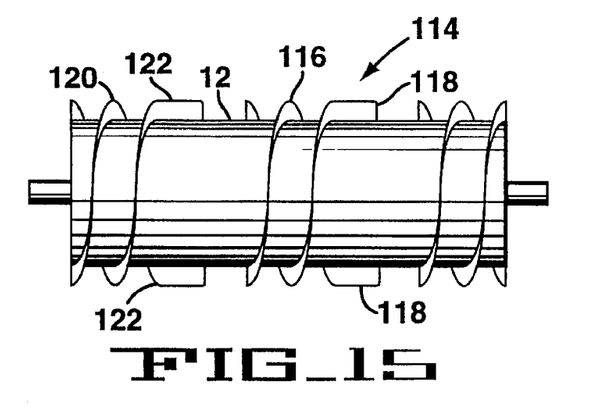
FIG. 15 is a finisher worm alternative embodiment.
Figure 16:
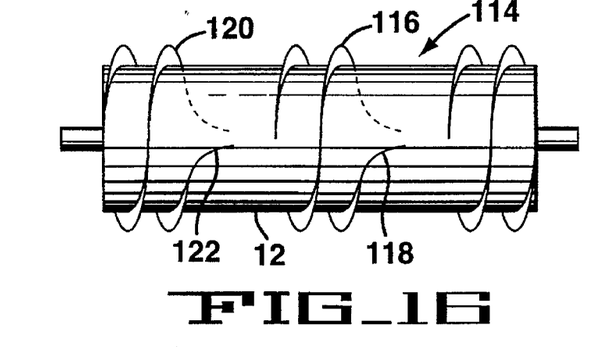
FIG. 16 is a view of the finisher worm of FIG. 15 rotated ninety degrees around its longitudinal axis.

FIGS. 15 and 16 show still another embodiment of the invention. In this embodiment the central intermediate zone, generally 114, includes deflector flights 116 which include defectors 118 appended to the high angle end of the flights. The pair of flights such as the single flight 116 will move pulp through the intermediate zone by the screw action of the flights 116 but will also turn the pulp cake and disrupt the layers of cake so that the cake near the drum or body 12 surface of the worm—which contains more juice than the cake closer to the screen surface of the finisher—can be turned or mixed so that more of the less dry cake can be transported to the screen surface of the finisher. In this FIG. 15 embodiment and FIG. 16 which is FIG. 15 rotated ninety degrees around the major axis, the infeed zone flights 120 (two shown) are similar to the flights 116 in the intermediate zone of the finisher worm. The infeed zone flights 120 include the deflectors 122 similar to the deflectors 118 of the flights in the intermediate zone.

Figure 17:
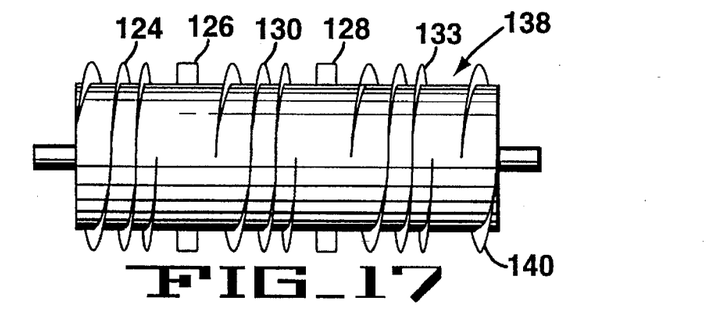
FIG. 17 is another embodiment of a finisher worm.
Figure 18:
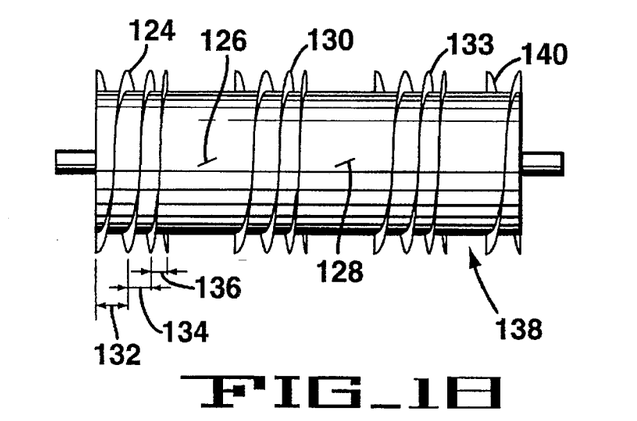
FIG. 18 is the finisher worm of FIG. 17 rotated ninety degrees around the major central axis of the worm.

FIGS. 17 and 18 show an embodiment of the invention using flights such as 124 and paddles such as 126. The paddles 126, 128 and the like, and the intermediate flights 130 all reside in the intermediate section of the screw worm. The flights 124, 130 and a third set of flights 133 are each similar in that the screw lend on these flights is constantly decreasing. That is, the distance shown as 132 is greater than the distance 134, which in turn is greater than the distance 136. This decreasing screw lead dimension tends to increase pressure on the pulp as the juice-containing pulp moves through the finisher barrel. The expectation is that more juice will be softly pressed out of the pulp in each set of decreasing lead flights 124, 130 and 133. The pressure will then be released as the juice and pulp enter the intermediate zone where it will be turned by the first set of paddles such as paddle 126. The pulp will then enter the second set of flights 130 and be compressed again while being moved through the finisher. The juice and pulp will then enter another portion of the intermediate zone of the finisher worm where it will be encountered again by the screw flight set 133 before it enters a non-flighted zone 138 and then the final flight 140 which helps drive the pulp out of the discharge port of the finisher.

The dimensions of 132, 134 and 136 are nominally sized. For instance, if the dimension 132 is "x" then dimension 134 is 0.75x and dimension 136 is 0.50x, for instance and as an example.

Figure 19:
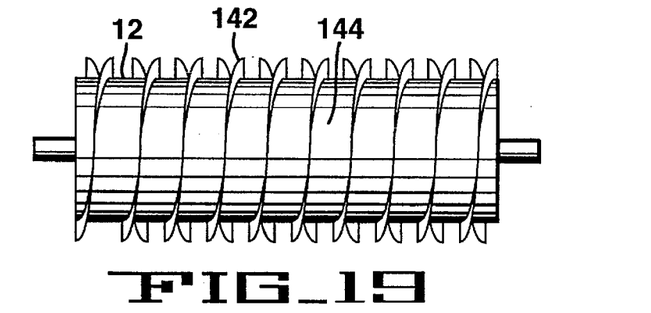
FIG. 19 is another embodiment of a finisher worm.
Figure 20:
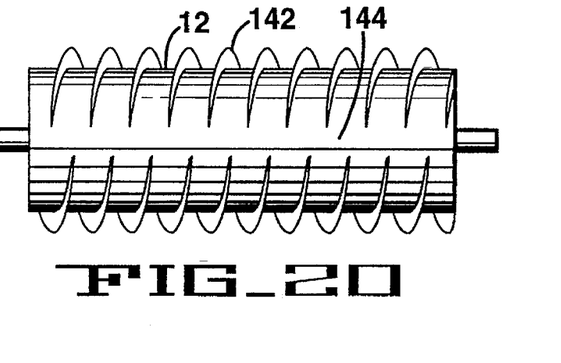
FIG. 20 is the finisher worm of FIG. 19 rotated ninety degrees around the major central axis of the worm.

FIGS. 19 and 20 show one further embodiment of the invention. In this example the short flights 142, for example, extend only part way around the circumference of the worm body 12. In the embodiment shown, the flights 142 extend for less than one hundred and eighty degrees leaving a zone 144 between flights. This design will move juice and pulp quickly through the finisher while allowing a zone of pulp to build up in the zone 144 between flights. The pulp turning and tumbling generated by this design also addresses the object of the invention of turning the pulp so that the wetter pulp gets exposed to the finisher screen and therefore doesn't have to be pushed at higher pressure through a level of dry pulp.

One element of this invention contemplates running the finisher worm at speeds less than the usual nominal 500 RPM generally used in the industry. It has been found that if there is a large flow of juice to the finisher, it can be run at maximum speed. However, if the supply of juice decreases, there is a chance that air will be drawn into the finisher to the detriment of juice quality. The problem is reduced if the finisher is slowed down so that the volume of the throughput of the finisher matches the volume of juice being sent to the finisher. If only a small volume of juice is sent to the finisher then the finisher will be slowed to about 200 RPM. As the quantity of juice being sent to the finisher increases, the rotational speed of the finisher will be increased to balance the finisher speed to the volume of juice seen at the inlet of the feeder.

Several different embodiments of the invention have been provided. They all are designed to be used in a variable speed finisher and generally speaking, each embodiment seeks to turn, tumble, fling, or otherwise mix up the cake in the finisher so that the higher volume juice-containing layer of cake at the surface of the drum or body of the screw worm gets shifted out toward the screen of the finisher. The following claims are presented with the intent of covering nuances of the invention not specifically claimed, but within the spirit of such claims.

What is claimed is:

1. In a juice finisher having a housing including a screen defining a central cavity, a transversely disposed rotating finisher worm, having a first section, an intermediate section, and a final section carried inside screen, the improvement to said finisher worm comprising:

a plurality of first flights carded on the surface of said finisher worm at said first section of said worm;

said intermediate section of said finisher worm beginning at the point where said plurality of first flights at said first section of said worm terminates;

a plurality of paddles on said intermediate section; and a plurality of final flights carded on the surface of said finisher worm at said final section thereof.

2. The invention in accordance with claim 1 wherein said intermediate section of said finisher worm includes a plurality of paddles thereon.

3. The invention in accordance with claim 2 wherein said paddles include a set of cake turners including a first cake turner and a second cake turner behind said first cake turner relative to the direction of rotation of said finisher worm.

4. The invention in accordance with claim 3 wherein said first cake turner is provided with an opening therein allowing material passing through said opening in said first cake turner to contact said second cake turner.

5. The invention in accordance with claim 2 wherein said paddles include a plurality of upstanding plate elements carried on said finisher worm in the intermediate zone thereof, said paddles affixed at an angle divergent from the direction of the major axis of said finisher worm.

6. The invention in accordance with claim 1 wherein said final and first flights have discreet beginning and ending points respectively and an upstanding paddle is connected to said beginning and ending points of said flights.

7. The invention in accordance with claim 1 wherein an inlet zone flight and an outlet zone flight are connected together by means of an elongated wiper, said wiper transversing said intermediate section of said finisher worm.

8. The invention in accordance with claim 1 wherein said intermediate section of said finisher worm includes intermediate flights not connected with either said first or said final flights.

9. The invention in accordance with claim 8 wherein said flights in said intermediate section of said finisher include infeed zone flight deflector means for deflecting pulp away from its position of repose.

10. The invention in accordance with claim 1 wherein said intermediate flights are discontinuous with said plurality of first flights and said plurality of final flights.

11. The invention in accordance with claim 10 wherein each one of said first and final flights extends less than halfway around the body of said worm.

12. The invention in accordance with claim 11 wherein each of said flights are spaced apart from a void zone running the length of said body of said worm.

13. The invention in accordance with claim 1 wherein the rotational speed of said finisher worm is adjustable in a range from approximately 200 RPM to approximately 500 RPM.

14. The invention in accordance with claim 13 wherein said rotational speed is adjusted to keep said finisher full with juice and pulp as the quantity of juice and pulp coming into the infeed section of the juice finisher.

15. The invention in accordance with claim I wherein said intermediate section includes intermediate flights which are continuous with said plurality of first flights of the said first section of said worm.

16. The invention in accordance with claim 15 wherein said intermediate flights are continuous with said final flights.

* * * * *